United States Patent [19]
Tanaka et al.

[11] Patent Number: 5,218,502
[45] Date of Patent: Jun. 8, 1993

[54] TAPE CASSETTE

[76] Inventors: Masato Tanaka; Kiyotaka Yanaka, both c/o Sony Corporation, 7-35 Kitashinagawa, 6-chome, Shinagawa-Ku, Tokyo, Japan

[21] Appl. No.: 760,055

[22] Filed: Sep. 13, 1991

[30] Foreign Application Priority Data

Sep. 20, 1990 [JP] Japan ................ 2-248613

[51] Int. Cl.$^5$ .............................. G11B 15/04
[52] U.S. Cl. ...................... 360/132; 360/60; 242/199
[58] Field of Search ............ 360/132, 60, 130.2, 360/137; 242/199

[56] References Cited

U.S. PATENT DOCUMENTS

| | | | |
|---|---|---|---|
| 4,041,537 | 8/1977 | Kishi | 360/60 |
| 4,044,386 | 8/1977 | Satou et al. | 360/132 |
| 4,769,732 | 9/1988 | Tanaka | 360/132 |
| 4,805,061 | 2/1989 | Champagne et al. | 360/60 |
| 5,091,901 | 2/1992 | Yamamoto et al. | 360/132 |

Primary Examiner—Paul M. Dzierzynski
Assistant Examiner—Don Wong

[57] ABSTRACT

A tape cassette includes one or more manually settable slider elements that are detected to prevent erroneously erasing information recorded on the cassette. The element slides in a through hole in the cassette case and includes stop surfaces that limit the travel of the slider element by cooperating with protrusions or shoulders that are formed by the respective half cases making up the cassette case. The slider element also includes a click-stop protrusion that cooperates with a protrusion in the through hole that is formed in only one of the two half-cases. The slider element further includes a through slot that permits deformation of the slider element as the click-stop protrusion goes over the protrusion in the through-hole, thereby requiring less force to move the element. The stop surfaces can be formed by two spaced apart protrusions that also permit deformation of the slide element as the click-stop protrusion travels past the protrusion in the through-hole.

22 Claims, 9 Drawing Sheets

TAPE CASSETTE

BACKGROUND OF THE INVENTION

1. Field of the Invention

The present invention relates generally to a cassette containing a recording medium and, more specifically, to a tape cassette for holding a magnetic tape that is provided with a slider capable of movement in the direction of thickness of the case of the cassette that can be manually set to prevent information recorded on the tape from being erroneously erased.

2. Description of the Background

Most tape cassettes are provided with some means for protecting recorded information from erroneous erasing. One such tape cassette is provided with an erase preventive lug as the erroneous erase preventive device, which erase preventive lug is broken and removed after information is recorded on the tape. The drawback in such previously proposed device is that because the broken erase preventive lug cannot be restored to the tape cassette, another member must be attached to the tape cassette in place of the erase preventive lug at the position that had previously been occupied by the erase preventive lug when it is desired to record new signals on the tape in the tape cassette.

Japanese Patent Laid-open (Kokai) No. Hei 1-102788 discloses a tape cassette provided with an erase prevention slider capable of moving between an eras enable position and a write protect position and is provided with first and second protrusions protruding in opposite directions that deviate from the direction of sliding of the slider. The cassette case is provided with a slider receiving hole provided with first and second recesses in the edge thereof. The slider is held at a first position with its first protrusion received in the first recess of the case or at a second position with its second protrusion received in the second recess of the case to set the tape cassette in the erase enable state or the write protect state, respectively.

Thus, the tape cassette can repeatedly be set for the erase enable state or the write protect state by shifting the slider alternately in opposite directions, and the slider can securely be held in place by the engagement of the first recess and the first protrusion or by the engagement of the second recess and the second protrusion. In the case, however, when neither the first protrusion nor the second protrusion of the slider is received in the corresponding recess, that is, in a transitional position when both the first and second protrusions of the slider are on the inner surface of the slider receiving hole of the case, there is a high pressure acting on the slider. Because of this pressure, the slider is difficult to move and hence the slider must be pushed hard in order to shift it, which effort may possibly damage the slider and the case of the tape cassette. This also makes the tape cassette containing the erroneous erasure preventing device difficult to handle.

OBJECTS AND SUMMARY OF THE INVENTION

Accordingly, it is an object of the present invention to provide a magnetic tape cassette having an erroneous erase prevention slider that can overcome the above-noted defects inherent in previously proposed cassettes.

It is another object of the present invention to provide a recording medium cassette provided with an erroneous erase prevention slider that is capable of being held in a stable manner at a desired position, thereby to ensure the prevention of erroneous erasing.

It is a further object of the invention to provide a tape cassette with an erroneous erase prevention slider capable of being easily set at an eras enable position or at a write protect position with a positive click action, and of being readily and satisfactorily operated even if the upper and lower half cases of the cassette are not joined together exactly or eve if the erroneous erase prevention slider and the hole receiving same have some dimensional errors.

According to one aspect of the present invention a recording medium cassette having a case is provided with a slider capable of being retained at a write protect position in the case to prevent erroneously erasing signals recorded on a type-shaped recording medium. Specifically, a slider holder is provided for holding the slider on the case, including a slider receiving hole provided with a recess, and a protrusion formed on the slider so as to engage the recess formed in the slider receiving hole. A click stop is included for retaining the slider at a predetermined erase enable position or at a predetermined write protect position, including protrusions formed on the slider and recesses formed in the slider receiving hole. The slider is provided with a slot extending between the opposite side surfaces thereof and adjacent to the side surfaces o which is formed the protrusion in order to make the slider more flexible.

The above and other objects, features, and advantages of the present invention will become apparent from the following description taken in connection with the accompanying drawings, in which the same reference numerals are used to indicate the same or similar elements.

DETAILED DESCRIPTION OF PREFERRED EMBODIMENTS

Figure 1A:
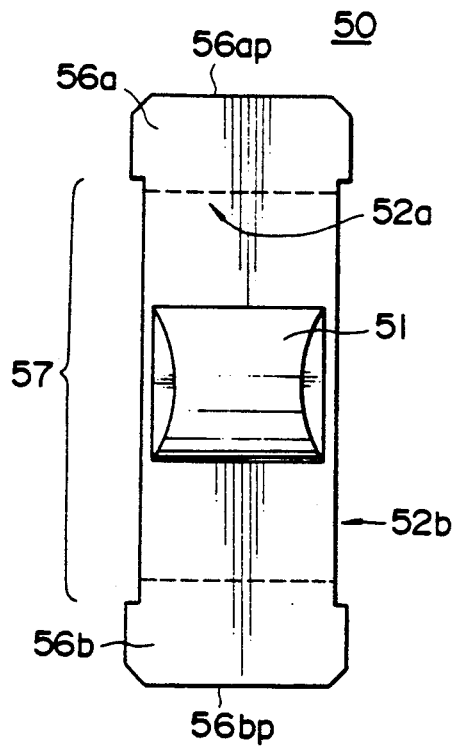
FIG. 1(*a*), 1(*b*), 1(*c*), 1(*d*), and 1(*e*) are a front view, a top view, a side view, a front perspective view, and a side perspective view, respectively, of a slider employed in a tape cassette according to a first embodiment of the present invention.
Figure 1B:
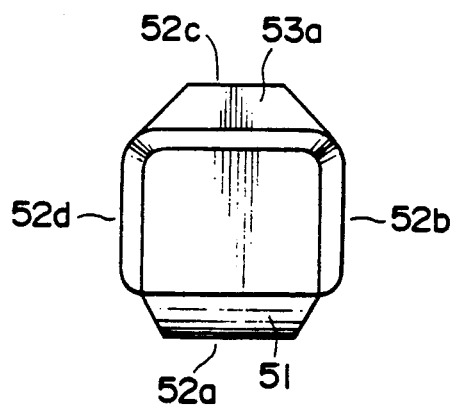
Figure 1C:
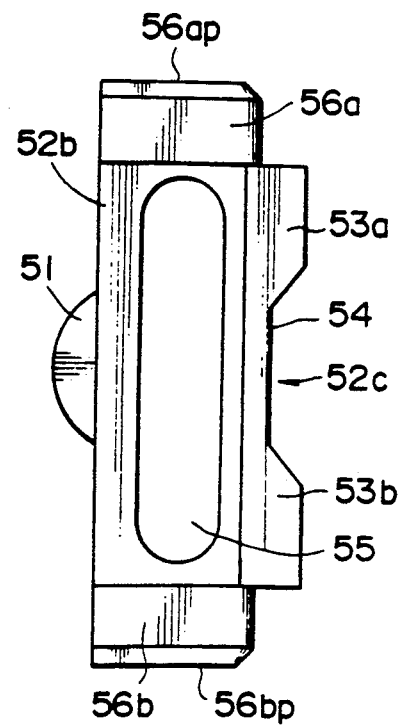
Figure 1D:
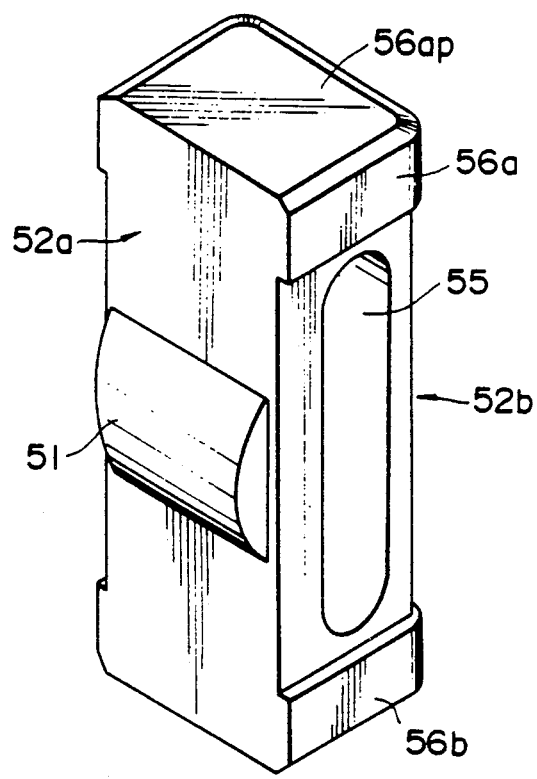
Figure 1E:
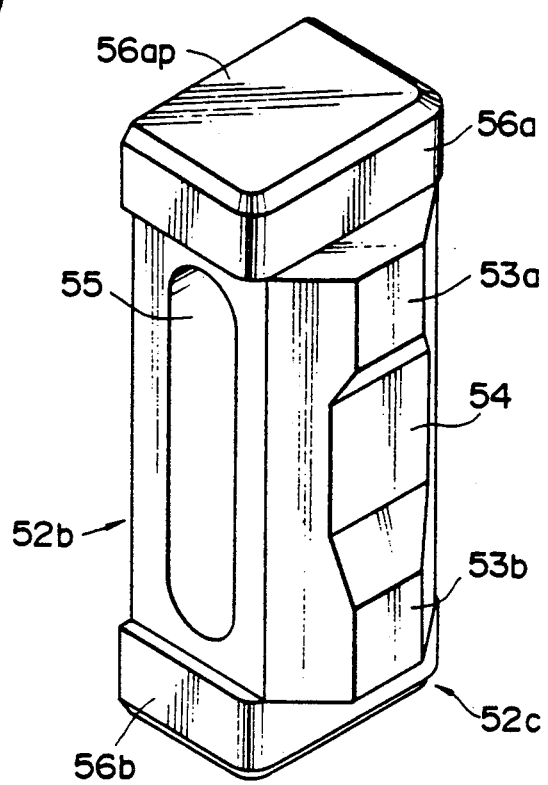

The present invention will be described in relation to miniature tape cassettes in which a first embodiment is shown in FIGS. 1 through 6. Specifically, referring to FIGS. 3 through 6, a tape cassette has a case 1 for holding a magnetic tape for recording signals, such as PCM signals. The case 1 is formed by joining together an upper half-case 2 and a lower half-case 3 with screws 4, and pivotally attaching a lid 6 to the front end to cover the front opening 5 of the case 1. The upper half-case 2 is provided with through holes 2a and 2b, and the lower half-case 3 is provided with through holes 3a and 3b to receive hub driving shafts. A first hub 7 is disposed coaxially with the through holes 2a and 3a, and a second hub 8 is disposed coaxially with the through holes 2b and 3b. A magnetic tape T is wound round the hubs 7 and 8 with one end thereof fastened to the first hub 7 and the other end thereof fastened to the second hub 8 so as to extend tautly between the hubs 7 and 8 and around pinch rollers 9 and 10, which also serve as guide rollers and which are supported for rotation at the opposite ends of the front side of the case 1. The magnetic tape T extends across the front opening 5.

Figure 6:
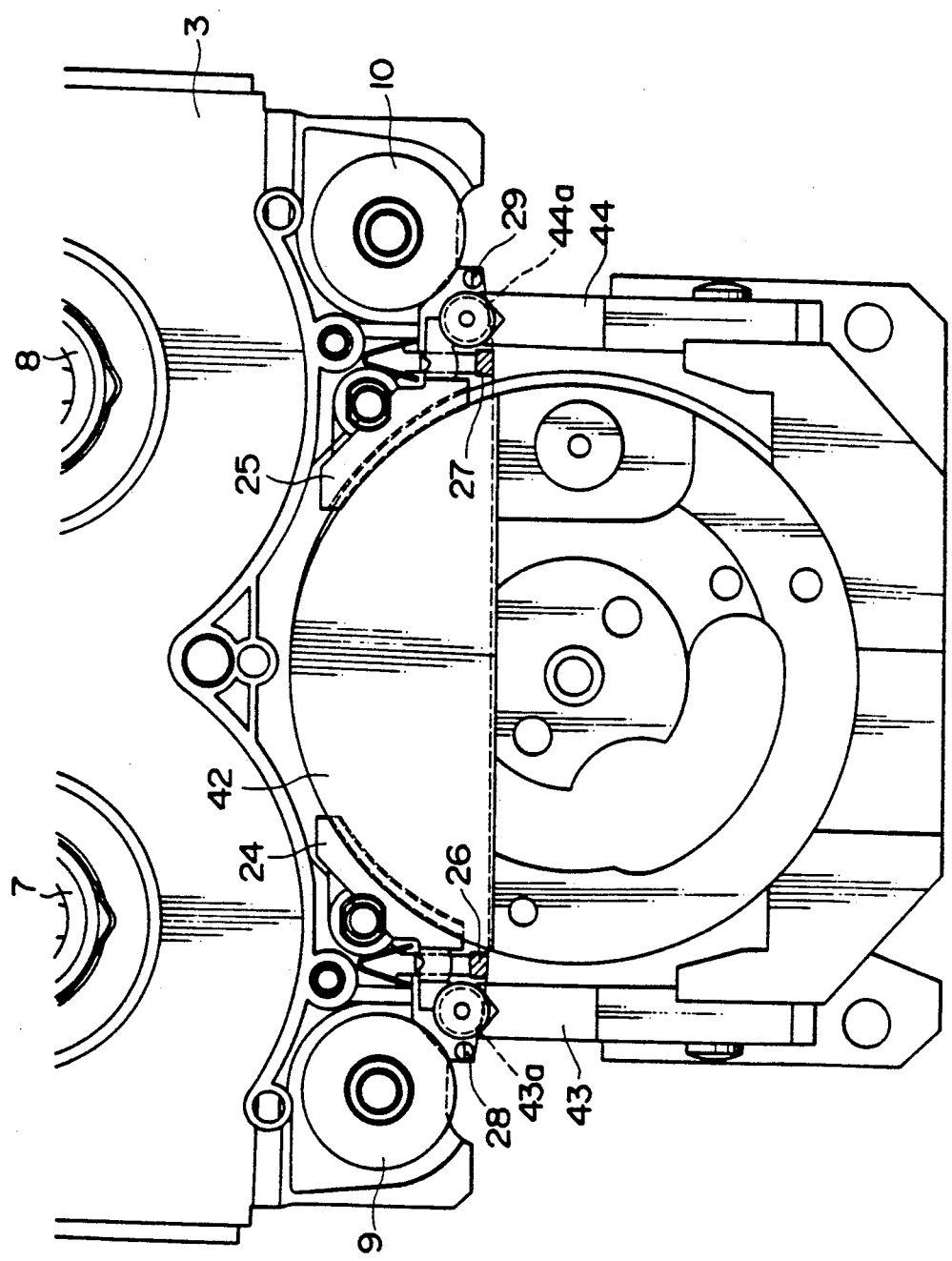
FIG. 6 is a plan view of the tape cassette disposed in an operating position relative to the head drum.

A braking mechanism 11 is provided within the case 1 to brake the hubs 7 and 8 while the tape cassette is not in use. Erroneous erase prevention mechanisms 12 and 13 are provided at the opposite corners of the back end of the case 1. A front reference positioning hole 14 and a back reference positioning hole 15 are formed along the center line of the case 1, as shown in FIG. 6. Reference positioning holes 16 and 17 are arranged near the opposite corners at the back of the case, a plurality of detection holes 18 and 19 are arranged along the back edge, and gripping recesses 20 and 21 are provided on opposite sides toward the back of the case 1. The lid 6 for covering the front opening 5 of the case 1 is provided with a longitudinal guide groove 22 along its front surface and also with notches 23 for use with a cassette changer.

Figure 4:
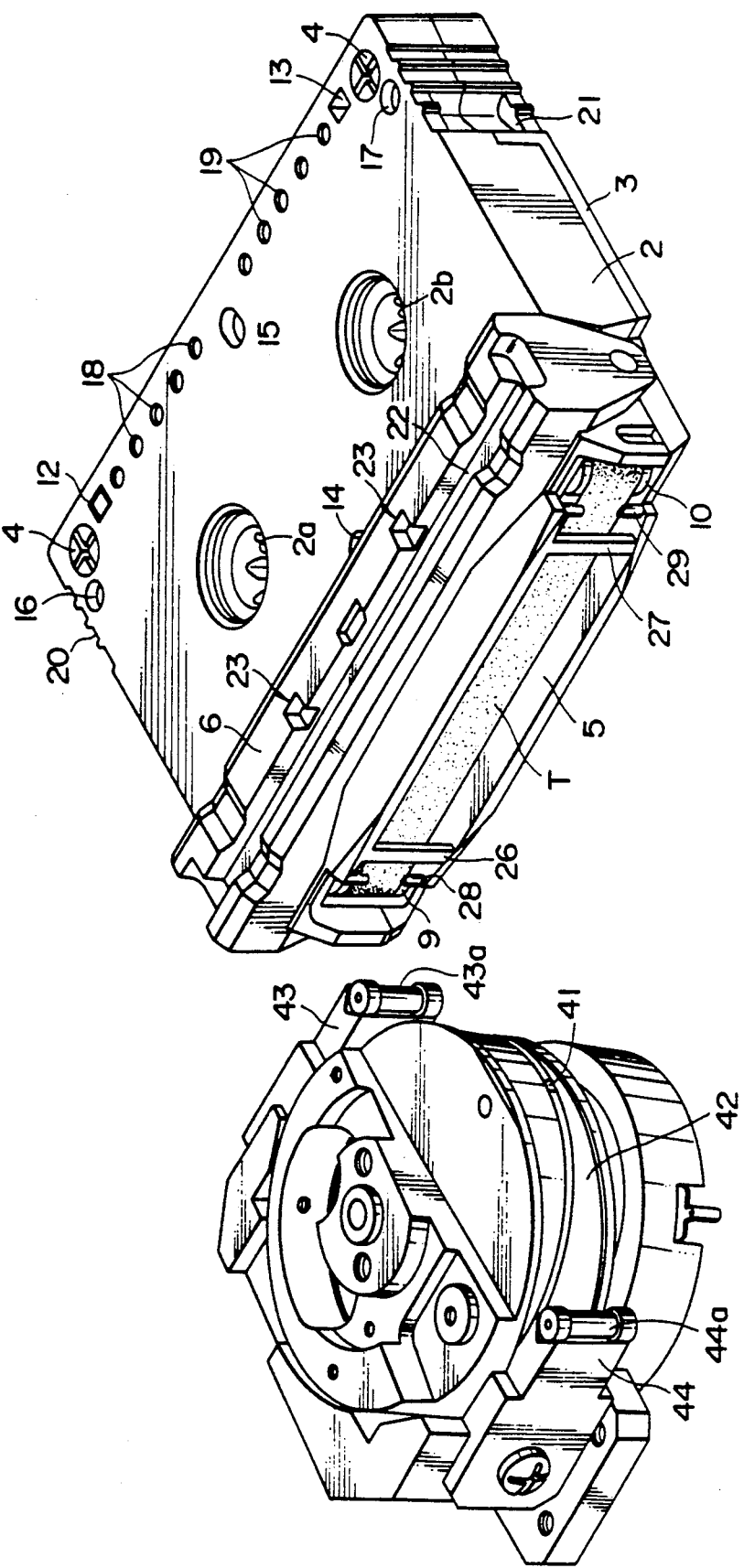
FIG. 4 is a perspective view of the tape cassette in juxtaposition to a rotary head drum.

Signals are recorded on or reproduced from the magnetic tape T contained in the case 1 with a rotary magnetic head 41 in a helical scanning mode. Referring to FIG. 4, the rotary magnetic head 41 revolves about an axis inclined at a predetermined angle to the axis of rotation of a head drum 42. The head drum 42 is partially received in the front opening 5 after turning the lid 6 upward or downward to open the front opening 5, so that the magnetic tape T slides along a portion of the circumference of the head drum 42 and the rotary magnetic head 41 travels obliquely relative to the magnetic tape T to perform the helical scanning operation.

Figure 5:
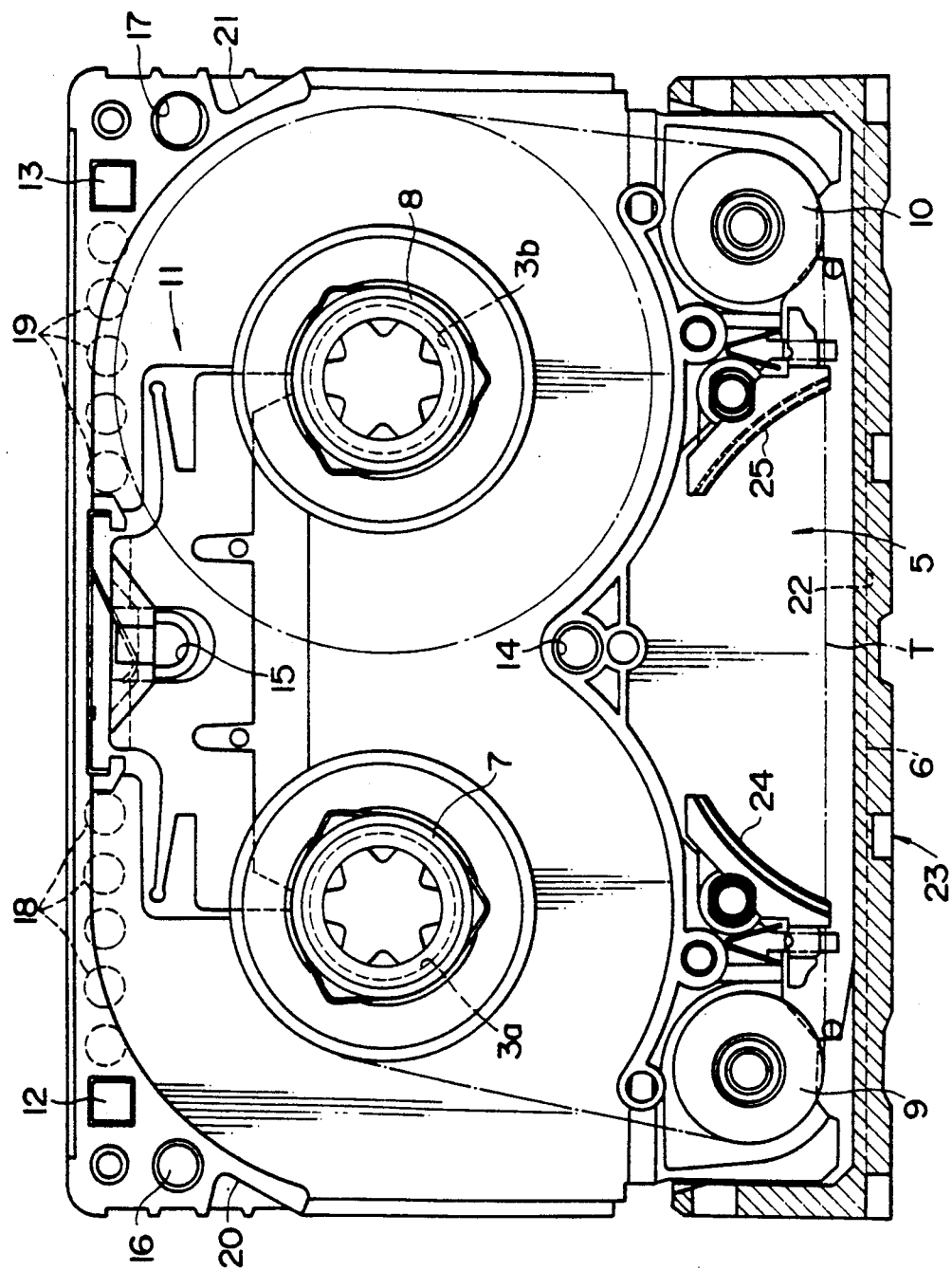
FIG. 5 is a plan view of a lower half case of the tape cassette of FIG. 3.

A pair of tape guide members 24 and 25 are shown in FIG. 5 inclined respectively in opposite directions and disposed respectively inside the guide rollers 9 and 10 in the opening 5 of the case 1. Tape guide members 24 and 25 are mounted for lateral movement and for swinging motion to ensure the helical sliding contact of the magnetic tape T with the head drum 42. Therefore, when the head drum 42 is inserted in the front opening 5, as shown in FIG. 6, the tape guide members 24 and 25 come into contact with the tape T wrapped around the circumference of the head drum 42 to hold the magnetic tape T on the head drum 42.

As shown in FIG. 4, wing guides 43 and 44 having respective rollers 43a and 44a are provided on the opposite sides of the head drum 42. When the head drum 42 is inserted in the front opening 5 of the case 1, the rollers 43a and 44a are inserted between the pinch roller 9 and the tape guide member 24 and between the pinch roller 10 and tape guide member 25, respectively, to press the magnetic tape T against the tape guide members 24 and 25. The wing guides 43 and 44 are inserted in the front opening 5 through a space between a stay 26 and a tape retaining pin 28 disposed between the pinch roller 9 and the stay 26 and through a space between a stay 27 and tape retaining pin 29 disposed between the pinch roller 10 and the stay 27, respectively.

Figure 2C:
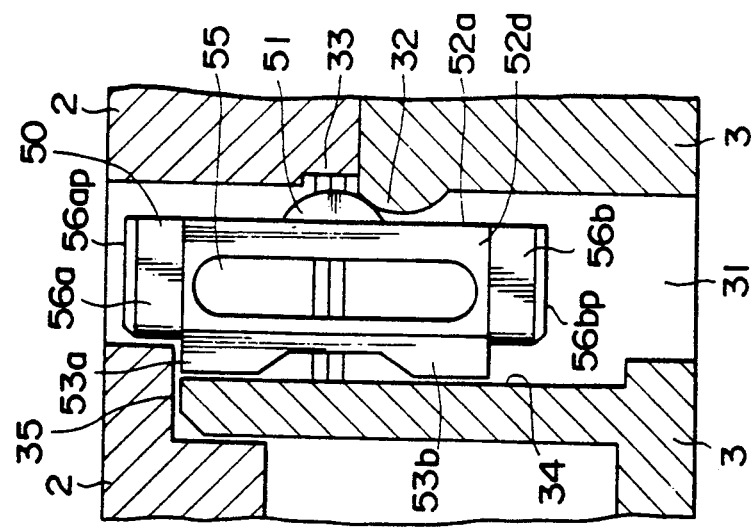
FIGS. 2(*a*), 2(*b*), and 2(*c*) are partial sectional views of an erroneous erase prevention mechanism included in the tape cassette of FIGS. 1(*a*)–1(*e*)
Figure 2B:
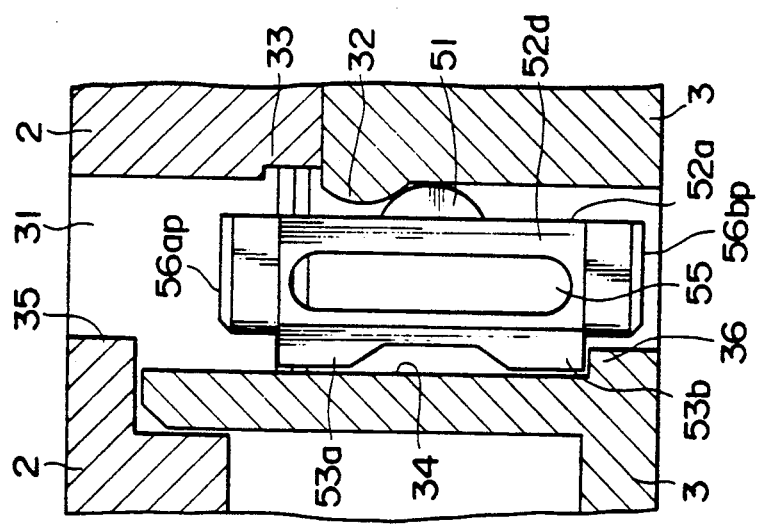
Figure 2A:
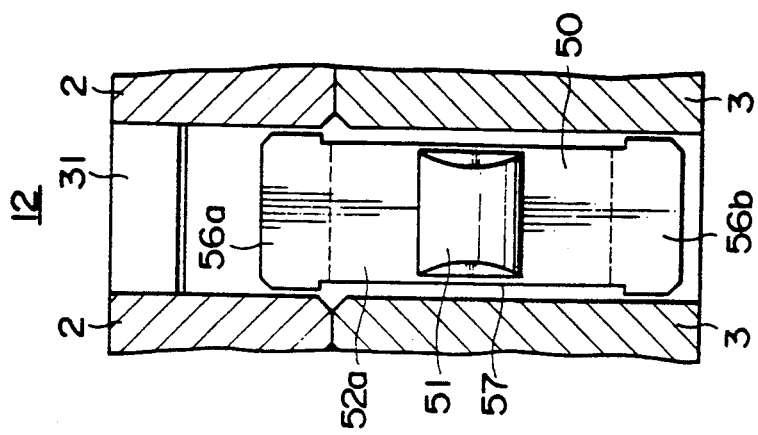
Figure 3:
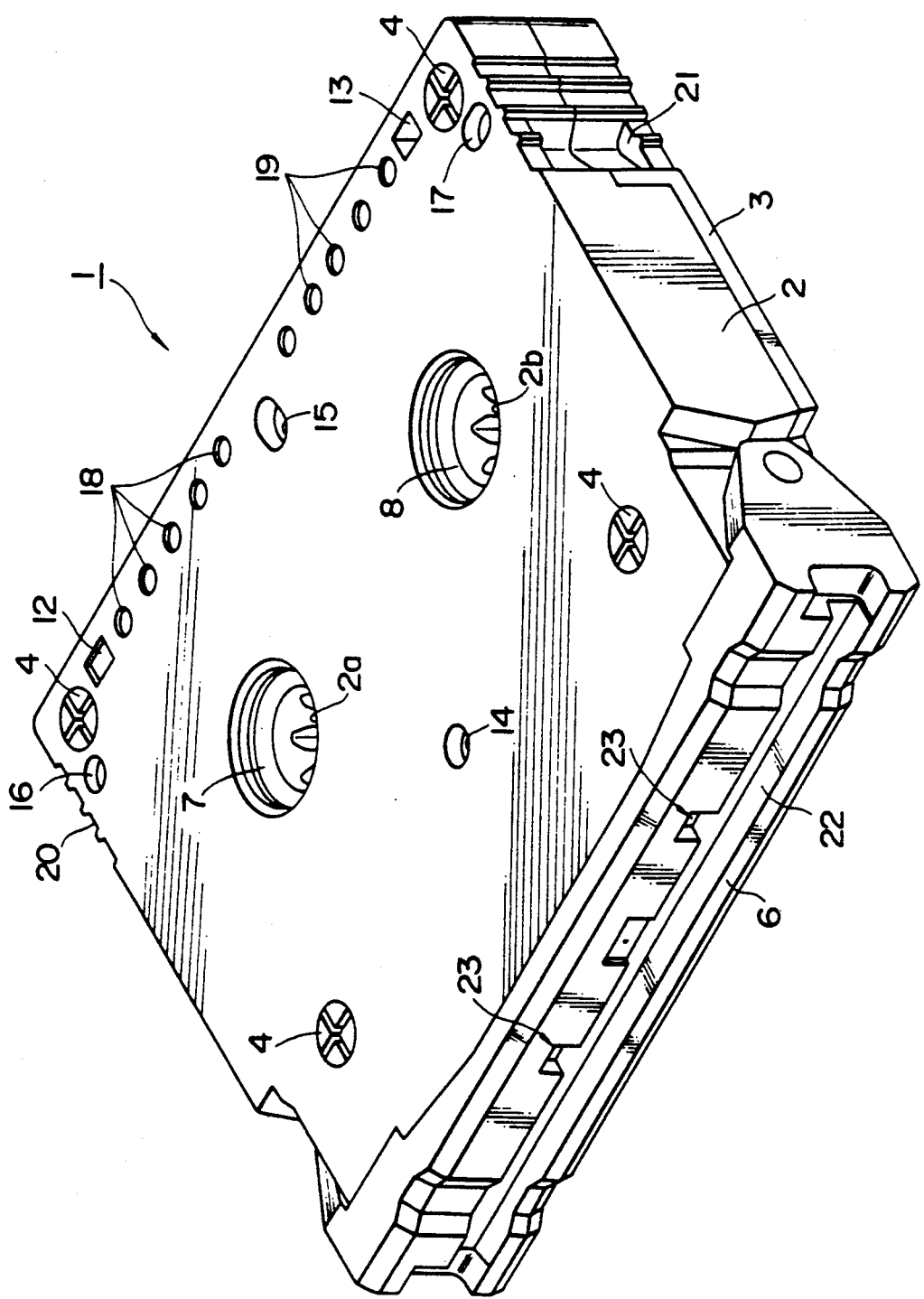
FIG. 3 is a perspective view of a tape cassette according to an embodiment of the present invention.

The erroneous erase prevention mechanisms 12 and 13 provided in the case 1 of the tape cassette are shown in FIGS. 1(a) to 1(e) and 2(a) to 2(c). Because the erroneous erase prevention mechanisms 12 and 13 are identical in construction, only mechanism 12 need be described. The erroneous erase preventive mechanism 12 is disposed near one corner at the back portion of the case 1. The erroneous erase preventive mechanism 12 has a slider element 50 slidably held in a through hole 31, as shown in FIGS. 2(a)-2(c). The slider element 50 extends across the width of the through hole 31. The slider element 50 is formed of an elastic synthetic resin in a shape substantially resembling a quadrangular prism and has four side surfaces 52a, 52b, 52c, and 52d. A rounded click-stop protrusion 51 protrudes from the side surface 52a, and protrusions 53a and 53b protrude from the surface 52c so as to form a recess 54 therebetween. The slider element 50 has a slot 55 extending through between the opposite side surfaces 52b and 52d.

As shown in FIG. 1(a), a neck portion 57 is formed by recessing the respective middle portions of the side surfaces 52b and 52d, in which the slot 55 opens, and between the upper and lower ends 56a and 56b. When the slider element 50 is inserted into the through hole 31, spaces are formed between the opposite surfaces of the neck portion 57 and the inner surfaces of the through hole 31. In a preferred embodiment, the top surface 56ap and bottom surface 56bp of the slider element 50 are respectively color coded, for example, red and blue.

FIGS. 2(a), 2(b), and 2(c) are partial sectional views showing a portion of the tape cassette around the through hole 31 with the slider element 50 inserted therein. FIG. 2(a) is a sectional view from the side of surface 52a of the slider element 50, and FIGS. 2(b) and 2(c) are sectional views from the side of surface 52d of the slider element 50. When the slider element 50 having a shape substantially resembling a quadrangular prism is inserted in the through hole 31, the side surfaces of the upper and lower ends 56a and 56b of the slider element 50 are in light contact with the side surfaces of the through hole 31. As shown in FIGS. 2(b) and 2(c), a click-stop protrusion 32 is formed in a side surface of the through hole 31 corresponding to the side surface 52a of the slider 50 on the lower half-case 3 to hold the slider 50 at either a lower position with the click-stop protrusion 51 in contact with the lower surface of the click-stop protrusion 32, as shown in FIG. 2(a), or in an upper position with the click-stop protrusion 51 in contact with the upper surface of the click-stop protrusion 32, as shown in FIG. 2(c). Steps 33 are formed contiguously with the click-stop protrusion 32 on the upper half case 2 to compensate for any mechanical deviation of the upper half-case 2 and the lower half-case 3 relative to each other. The protrusions 53a and 53b protruding from the side surface 52c of the slider element 50 slide along a slide surface 34 formed on the lower half-case 3. The upward movement of the slider element 50 is limited by a limiting portion 35 of the upper half-case 2 and the downward movement of the same is limited by a limiting portion 36 of the lower half-case 3. In FIG. 2(b) the slider element 50 is shown at its lowermost position, with the lower protrusion 53b in contact with the limiting portion 36 and being held in place by the engagement of the click-stop protrusion 51 and the click-stop protrusion 32 in the through hole 31.

In changing the status of the tape cassette between an erase enable state and a write protect state, the slider element 50 is pressed at the top surface 56ap or the bottom surface 56bp with a thin stylus, such as a mechanical pencil, to shift the slider element 50 between the uppermost position and the lowermost position. Then, the click-stop protrusion 51 rides over the click-stop protrusion 32 to allow the slider 50 to be moved in the direction of the pressure applied thereto. Because the slider element 50 is provided with the slot 55, the portion of the slider element 50 having the side surface 52a provided with the click-stop protrusion 51 is able to flex toward the slot 55, so that the slider element 50 can be moved from the lowermost position, as shown in FIG. 2(b), to the uppermost position, as shown in FIG. 2(c), and vice versa. Thus, the slot 55 allows the portion of the slider having the side surface 52a provided with the click-stop protrusion 51 to flex easily, so that the slider element 50 can be shifted with a click to either the uppermost position or the lowermost position, as desired, using only moderate pressure. Because the pressure acting between the click-stop protrusions 51 and 53 is not excessively high, the durability of the erroneous eras prevention mechanism 12 is improved, and the pressure required for shifting slider element 50 varies only a little over its lifetime.

The high yielding capability of the click-stop protrusion 51 owing to the sufficient elastic bending of the portion of the slider 50 having the side surface 52a also compensates any dimensional errors in the components and parts, including the click-stop protrusion 32, as well as any errors in joining together the upper half-case 2 and the lower half-case 3, so that the slider element 50 is able to function satisfactorily even if the plastic tape cassette has some dimensional errors.

Because the click-stop protrusion 51 and 32 are rounded, the slider element 50 is never suspended between the uppermost and lowermost positions but must be positively shifted to either the lowermost position, as shown in FIG. 2(b), or to the uppermost position, as shown in FIG. 2(c), so that the status of the tape cassette can accurately be discriminated between the erase enable state and the write protect state.

Since the click-stop protrusion 32 is formed in a rounded shape substantially in the middle portion of the through hole 31 on only the lower half-case 3, and the upper half-case 2 is joined to the lower half-case 3 in a plane above the click-stop protrusion 32, the click-stop protrusion 32 has a smooth surface even if the upper half-case 2 and the lower half-case 3 are dislocated relative to each other. This feature enables the click-stop protrusion 51 of the slider element 50 to ride smoothly over the click-stop protrusion 32.

Since the slide surface 34 along which the protrusions 53a and 53b slide is formed only on the lower half-case 3, the slide surface 34 is a smooth, continuous surface even if the upper half-case 2 and the lower half-case 3 are dislocated relative to each other. This feature enables the slider element 50 to slide smoothly along the slide surface 34. Alternatively, the click-stop protrusion 32 and the slide surface 24 may be formed on the upper half-case 2 instead of on the lower half-case 3, with the same beneficial results.

As described above in reference to FIG. 1(a), the opposite side surfaces of the neck portion 57 of the slider element 50 are separated from the inner surfaces of the through hole 31. Accordingly, even if the upper half case 2 and the lower half case 3 are dislocated relatively laterally in a direction parallel to the side surface 52a having the click-stop protrusion 51, steps formed at the junction of the upper half-case 2 and the lower half-case 3 are unable to come into contact with the side surfaces of the slider element 50 and, hence, the sliding movement of the slider element 50 is not obstructed by any such steps caused by the dislocation.

As best understood from FIGS. 2(b) and 2(c), because the protrusions 53a and 53b are formed at the opposite ends of the side surface 52c, and the click-stop protrusion 51 is formed at the middle of the side surface 52a opposite the side surface 52c, the slider element 50 is held stably at three points on the side surfaces of the through hole 31.

The top surface 56ap of the slider element 50 is color coded red and the bottom surface 56bp of the slider element 50 is color coded blue, for example. If it is assumed that the erroneous erase prevention mechanism 12 shown in FIGS. 2(a) to 2(c) is for side A of the tape cassette, then side A is in the write protect state when the slider element 50 is at the lowermost position having the blue bottom surface 56bp exposed on the surface of the lower half-case 2, as shown in FIG. 2(c). Then, the erase enable and write protect status of side A and that of side B of the tape cassette can readily be discriminated at a glance simply by recognizing the color exposed in the surface of the tape cassette.

Figure 7:
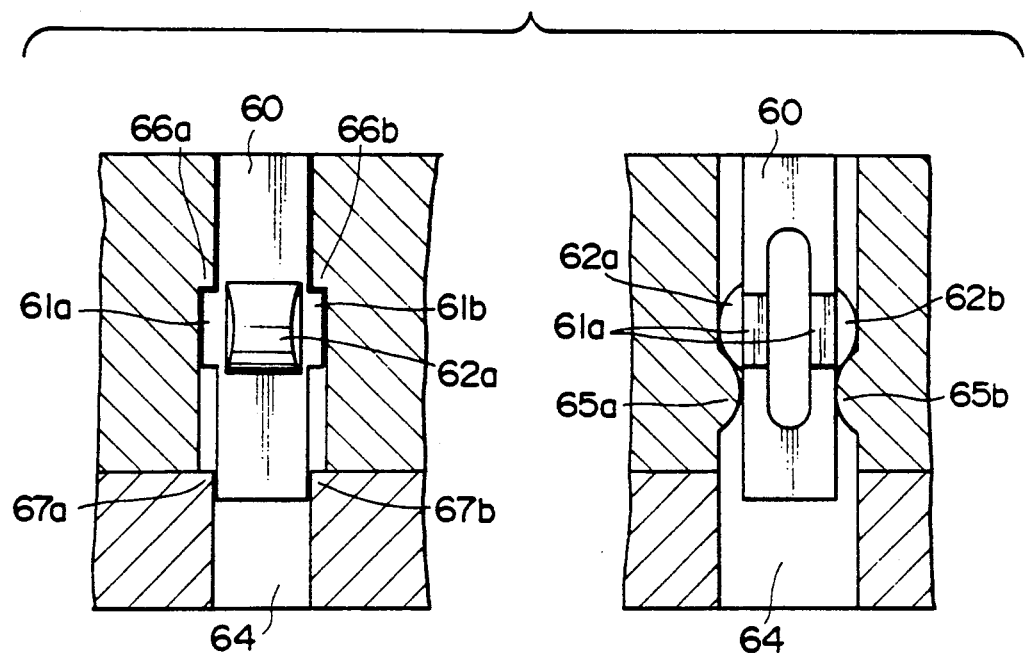
FIG. 7 includes partial sectional views of a second embodiment of a slider according to the present invention.

A second embodiment according to the present invention employs a slider element 60 shown in FIG. 7. The slider element 60 is provided with two protrusions 61a and 61b respectively on the opposite side surfaces thereof, with click-stop protrusions 62a and 62b respectively on the other opposite side surfaces thereof. A through slot 63 is formed between the side surfaces provided with the protrusions 61a and 61b. Two click-stop protrusions 65a and 65b are formed respectively on the opposite inner surfaces of a through hole 64 on slider element 60. The through hole 64 is provided with an upper shoulder 66a and a lower shoulder 67a for cooperating with the protrusion 61a and an upper shoulder 66b and a lower shoulder 67b for cooperating with the protrusion 61b.

Figure 8:
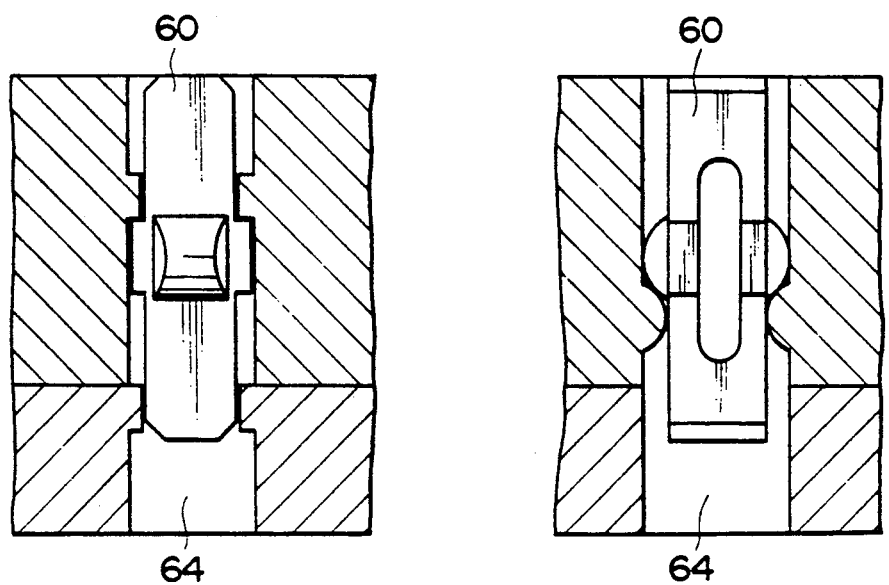
FIG. 8 includes partial sectional views of a third embodiment of a slider according to the present invention.

A third embodiment according to the present invention employs an erroneous erase prevention mechanism shown in FIG. 8 that is similar to the embodiment shown in FIG. 7. As shown in FIG. 8, the opposite ends of the through hole 64 near the opposite surfaces of the case 1 are expanded to facilitate the actuation and operation of the slider element 60.

Figure 9:
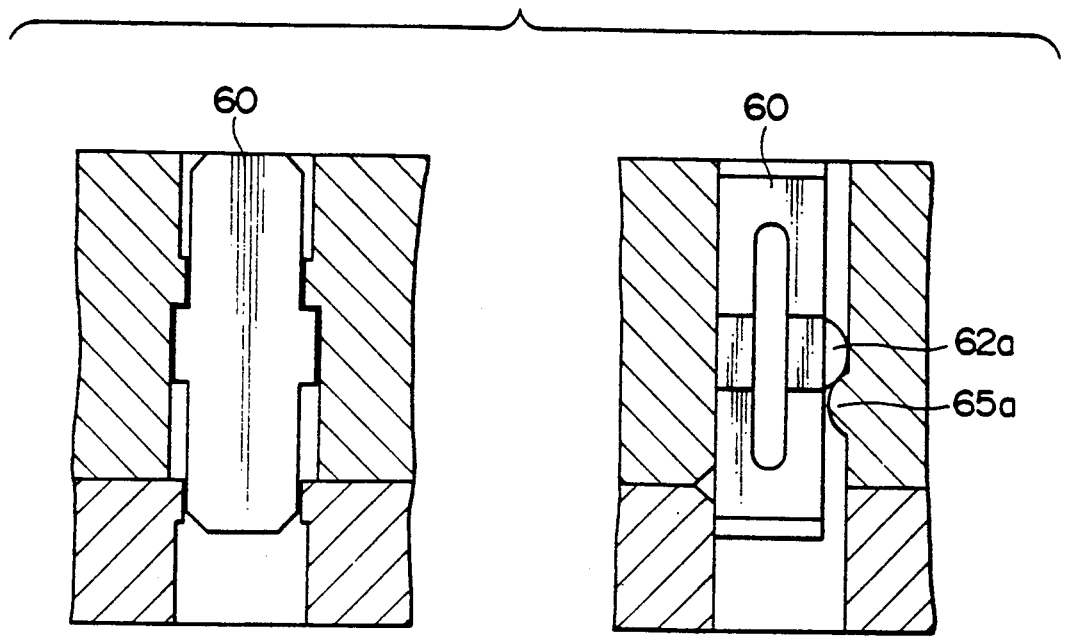
FIG. 9 includes partial sectional views of a fourth embodiment of a slider according to the present invention.

FIG. 9 shows an erroneous erase prevention mechanism employed in a tape cassette that is a modification of the erroneous erase prevention mechanism shown in FIG. 8 in which in the slider element 60 employs only one click-stop mechanism formed by protrusions 62a and 65a.

Figure 10:
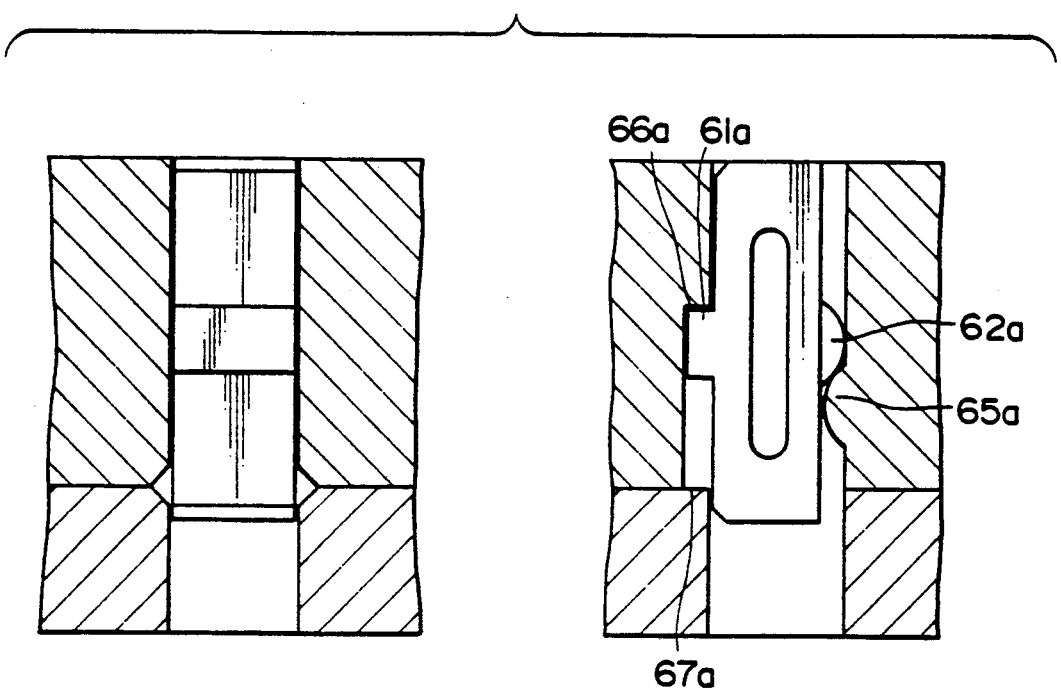
FIG. 10 includes partial sectional views of a fifth embodiment of a slider according to the present invention.

FIG. 10 shows an erroneous erase prevention mechanism employed in a tape cassette that is a further modification of the erroneous erase prevention mechanism shown in FIG. 8. As shown in FIG. 10, the slider employed in the erroneous erase prevention mechanism has omitted therefrom the click-stop protrusions 62b and 65b, the protrusion 61b, and the shoulders 66b and 67b. The positive click-stop action is provided only on one side by elements 62a and 65a, and the slider element is limited by protrusion 66a abutting stops 61a and 67a at opposite ends of its travel, as in FIG. 7.

In either embodiment, the effect of the slider element is the same and the top and bottom surfaces of the slider 60 are colored respectively in red and blue to facilitate discrimination of the status of the tape cassette between the write enable state and the write protect state.

The slider elements 50 and 60 may be formed by two-color molding and the write enable state and the write protect state may be indicated respectively by red and blue, or vice versa. Alternatively, the write enable state and the write protect state may be indicated by any two contrasting colors other than red and blue. Because it is only necessary that the top surface 56ap and the bottom surface 56bp can be discriminated from each other, only one of the top surface 56ap or the bottom surface 56bp may be colored, however, it is desirable that the colors of the top surface 56ap and the bottom surface 56bp are readily discernable as being different than the color of the case 1.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. In a recording cassette comprising a case having a through hole at a predetermined position extending across the thickness of the case, and a slider inserted in the through hole for sliding movement therein between predetermined positions that are detected to prevent erroneously erasing signals already recorded on a recording medium contained in the case, said slider including:
   an elongate body having a plurality of side surfaces;
   a plurality of stopping surfaces protruding at predetermined positions on said body for engaging respective first protrusions formed in the through hole of the case and defining a range of sliding movement of the body in the through hole;
   a click-stop protrusion formed at a predetermined position on a side surface of said body so as to engage a second protrusion formed in the through hole of the case to hold the body at either a first position corresponding to a record protect state or a second position corresponding to a record enable state; and
   a through slot formed in said body between opposite side surfaces adjacent the side surface on which the click-stop protrusion is formed.

2. A recording cassette according to claim 1, wherein said body has a shape substantially in the form of a quadrangular prism.

3. A recording cassette according to claim 1, wherein said plurality of stopping surfaces and said click-stop protrusion are formed on opposite side surfaces of said elongate body.

4. A recording cassette according to claim 1, wherein said plurality of stopping surfaces are formed by two protrusions that protrude from the side surfaces of said elongate body adjacent to the side surface on which the click-stop protrusion is formed, and said through slot extends through the side surfaces on which the two protrusions are formed.

5. A recording cassette according to claim 1, wherein said stopping surfaces are formed by two protrusions both formed on the same side surface of said body and being spaced apart from each other with respect to a direction of movement of said slider.

6. A recording cassette according to claim 1, wherein said plurality of stopping surfaces comprise two protrusions spaced apart from each other with respect to a direction perpendicular to a direction of movement of said slider and formed respectively on opposite side surfaces of said body.

7. A recording cassette according to claim 1, wherein said click-stop protrusion is formed substantially at a mid-position along the longitudinal axis of said elongate body.

8. A recording cassette according to claim 1, wherein said click-stop protrusion is formed as a rounded protrusion.

9. A recording cassette according to claim 1, wherein said second protrusion is formed at a middle position in said through hole.

10. A recording cassette according to claim 1, wherein said second protrusion is formed as a rounded protrusion.

11. A recording cassette according to claim 1, wherein said case is formed by joining together an upper half-case and a lower half-case and in which a slide surface, along which the plurality of stopping surfaces protruding on said elongate body slide, is formed entirely in the upper half-case.

12. A recording cassette according to claim 1, wherein said case is formed by joining together an upper half-case and a lower half-case and in which a slide surface, along which said plurality of stopping surfaces protruding on said elongate body slide, is formed entirely in the lower half-case.

13. A recording cassette according to claim 1, wherein said case is formed by joining together an upper half-case and a lower half-case and in which said second protrusion formed in said through hole that engages said click-stop protrusion is formed entirely on the upper half-case.

14. A recording cassette according to claim 1, wherein said case is formed by joining together an upper half-case and a lower half-case and in which said second protrusion formed in said through hole that engages said click-stop protrusion is formed entirely on the lower half-case.

15. A recording cassette according to claim 1, wherein said elongate body is provided with a neck portion formed by recesses on respective intermediate portions of the side surfaces adjacent the side surface on which said click-stop protrusion is formed, so that the surfaces of the neck portion are separated from the inner walls of said through hole.

16. A recording cassette according to claim 1, wherein one longitudinal end surface of said elongate body is colored in a first color different from a color of said case, and the other longitudinal end surface of said elongate body is colored in a second color different from the color of said case and from the first color.

17. In a tape cassette having a case with a through hole from one flat side of the case to the other, and a slider arranged for sliding movement in the through hole between two end positions that are detected to prevent erroneously erasing signals already recorded on the tape, said slider including:
- an elongate body having a plurality of side surfaces;
- a plurality of stop surfaces protruding at predetermined positions on said body for engaging first protrusions formed in the through hole and defining a range of sliding movement of the body;
- a click-stop protrusion formed at a predetermined position on a side surface of said body for engaging a second protrusion formed in the through hole, whereby said body resides either at a first position on one side of the second protrusion or a second position on the other side of the second protrusion; and
- a slot formed completely through said body between opposite side surfaces adjacent the side surface of said elongate body on which the click-stop protrusion is formed.

18. A tape cassette according to claim 17, wherein said plurality of stop surfaces are formed by two protrusions and said click-stop protrusion and said two protrusions are formed on opposite side surfaces of said elongate body and said slot extends through side surfaces of said elongate body adjacent the side surface on which said click-stop protrusion is formed.

19. A tape cassette according to claim 17, wherein said plurality of stop surfaces are formed by two protrusions protruding from said side surfaces of said elongate body adjacent to the side surface on which said click-stop protrusion is formed, and said slot extends between the side surfaces on which the two protrusions are formed.

20. A tape cassette according to claim 17, further comprising a second click-stop protrusion formed on a side surface of said body opposite said first click-stop protrusion, said plurality of stop surfaces being arranged on at least one of the remaining side surfaces of said elongate body.

21. A tape cassette according to claim 20, wherein said first and second click-stop protrusions are both substantially at a mid-position on said elongate body with respect to the longitudinal axis thereof.

22. A tape cassette according to claim 17, wherein said elongate body is provided with a neck portion formed by recesses on respective intermediate portions of side surfaces adjacent the side surface on which said click-stop protrusion is formed, so that the surfaces of the neck portion separated from the inner walls of said through hole.

* * * * *

UNITED STATES PATENT AND TRADEMARK OFFICE
CERTIFICATE OF CORRECTION

PATENT NO. : 5,218,502
DATED      : June 8, 1993
INVENTOR(S): Masato Tanaka, Kiyotaka Yanaka It is certified that error appears in the above-indentified patent and that said Letters Patent is hereby corrected as shown below:

```
Col. 1, line 29, change "eras" to --erase--
Col. 2, line 5, change "eras" to --erase--
        line 9, change "eve" to --even--
        line 16, change "type" to --tape--
        line 27, change "o" to --on--
Col. 5, line 33, change "eras" to --erase--

Col. 9, line 23, after "body" insert --,--
```

Signed and Sealed this

Twelfth Day of July, 1994

Attest:

BRUCE LEHMAN

*Attesting Officer*  *Commissioner of Patents and Trademarks*